United States Patent
McPhee et al.

(10) Patent No.: US 11,122,113 B2
(45) Date of Patent: Sep. 14, 2021

(54) SYSTEM AND METHOD FOR TRANSFERRING VALUE BETWEEN DATABASE RECORDS

(71) Applicant: The Toronto-Dominion Bank, Toronto (CA)

(72) Inventors: Adam Douglas McPhee, Toronto (CA); Matta Wakim, Toronto (CA); Aaron Stuart, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/700,175

(22) Filed: Dec. 2, 2019

(65) Prior Publication Data
US 2020/0106830 A1    Apr. 2, 2020

Related U.S. Application Data

(63) Continuation of application No. 15/723,722, filed on Oct. 3, 2017, now Pat. No. 10,530,841.

(51) Int. Cl.
*H04L 29/08* (2006.01)
*G06Q 40/00* (2012.01)
(Continued)

(52) U.S. Cl.
CPC .............. *H04L 67/10* (2013.01); *G06F 16/27* (2019.01); *G06F 16/951* (2019.01); *G06Q 20/10* (2013.01); *G06Q 40/12* (2013.12); *G06F 3/0484* (2013.01)

(58) Field of Classification Search
CPC ........ H04L 67/10; G06Q 40/12; G06Q 20/10; G06F 16/27; G06F 16/951; G06F 3/0484
See application file for complete search history.

(56) References Cited

U.S. PATENT DOCUMENTS

| 7,266,533 B2 | 9/2007 | Karas et al. |
| 8,285,587 B2 | 10/2012 | Saguy |

(Continued)

FOREIGN PATENT DOCUMENTS

| WO | 02059847 A1 | 8/2002 |
| WO | 2015036817 A1 | 3/2015 |
| WO | 2017011596 A1 | 1/2017 |

OTHER PUBLICATIONS

Saturn: "Smart Cards for Great Gifts: Saturn Introduces Two Innovative Gift Cards", retrieved from: http://www.mediamarktsaturn.com/en/press/press-releases/smart-cards-great-gifts-saturn-introduces-two-innovative-gift-cards Jan. 4, 2018.

(Continued)

*Primary Examiner* — Kristie D Shingles
(74) *Attorney, Agent, or Firm* — Rowand LLP

(57) ABSTRACT

A computer system for transferring value between database records includes a memory storing instructions that, when executed by a processor, cause the computer system to: receive configuration options for configuring a particular transfer of value between database records and specifying a graphical element to be provided upon completion of the transfer and an email address; send a request to a communications server including the email address for use as a destination for a communication indicating that the transfer has been initiated including an indication of an identifier for the transfer; store an indication of the graphical element in association with the identifier; receive a request to complete the transfer indicating the identifier; retrieve the indication of the graphical element based on the identifier; confirm the transfer; and send a reply indicating completion of the transfer including an indication of the retrieved indication of the graphical element.

20 Claims, 9 Drawing Sheets

(51) Int. Cl.
*G06Q 20/10* (2012.01)
*G06F 16/27* (2019.01)
*G06F 16/951* (2019.01)
G06F 3/0484 (2013.01)

(56) References Cited

U.S. PATENT DOCUMENTS

| | | |
|---|---|---|
| 8,489,483 B1 | 7/2013 | Gillin et al. |
| 10,395,247 B2 * | 8/2019 | Gilliam, III ......... G06Q 20/405 |
| 2006/0098650 A1 | 5/2006 | Beninato et al. |
| 2007/0124676 A1 | 5/2007 | Amundsen et al. |
| 2009/0132500 A1 | 5/2009 | Jones et al. |
| 2010/0030578 A1 | 2/2010 | Siddique et al. |
| 2013/0204739 A1 | 8/2013 | Friedman |
| 2013/0238491 A1 | 9/2013 | Bouey et al. |
| 2015/0112866 A1 | 4/2015 | Muthu et al. |
| 2016/0103563 A1 | 4/2016 | Greenburg et al. |
| 2016/0117675 A1 | 4/2016 | Celikyilmaz |
| 2016/0321625 A1 | 11/2016 | Gillima, III et al. |
| 2017/0178093 A1 * | 6/2017 | Bull ....................... G06Q 20/10 |

OTHER PUBLICATIONS

CIPO, Examiner's Report relating to CA application No. 2,981,326 dated Feb. 11, 2021.
CIPO, Examiner's Report relating to CA application No. 2,981,326 dated Jun. 3, 2021.

* cited by examiner

SYSTEM AND METHOD FOR TRANSFERRING VALUE BETWEEN DATABASE RECORDS

CROSS-REFERENCE TO RELATED APPLICATIONS

This application is a continuation of U.S. patent application Ser. No. 15/723,722 entitled "SYSTEM AND METHOD FOR TRANSFERRING VALUE BETWEEN DATABASE RECORDS", filed Oct. 3, 2017, the contents of which are herein incorporated by reference in their entirety.

TECHNICAL FIELD

The present application relates to databases, and, more particularly, to transferring value between database records.

BACKGROUND

Databases may include one or more records. Value may be transferred between records in a database or between records in more than one database.

Transfers of value may be initiated or completed, directly or indirectly, by users. Some such users may be involved in initiating or completing many transfers. Other users may be involved initiating or completing transfers more infrequently. Some or all of these transfers of value may be initiated by different other users or by the same other user but for different purposes or occasions. Existing value transfer servers, however, may provide users with little context identifying or distinguishing value transfers in which they are involved.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
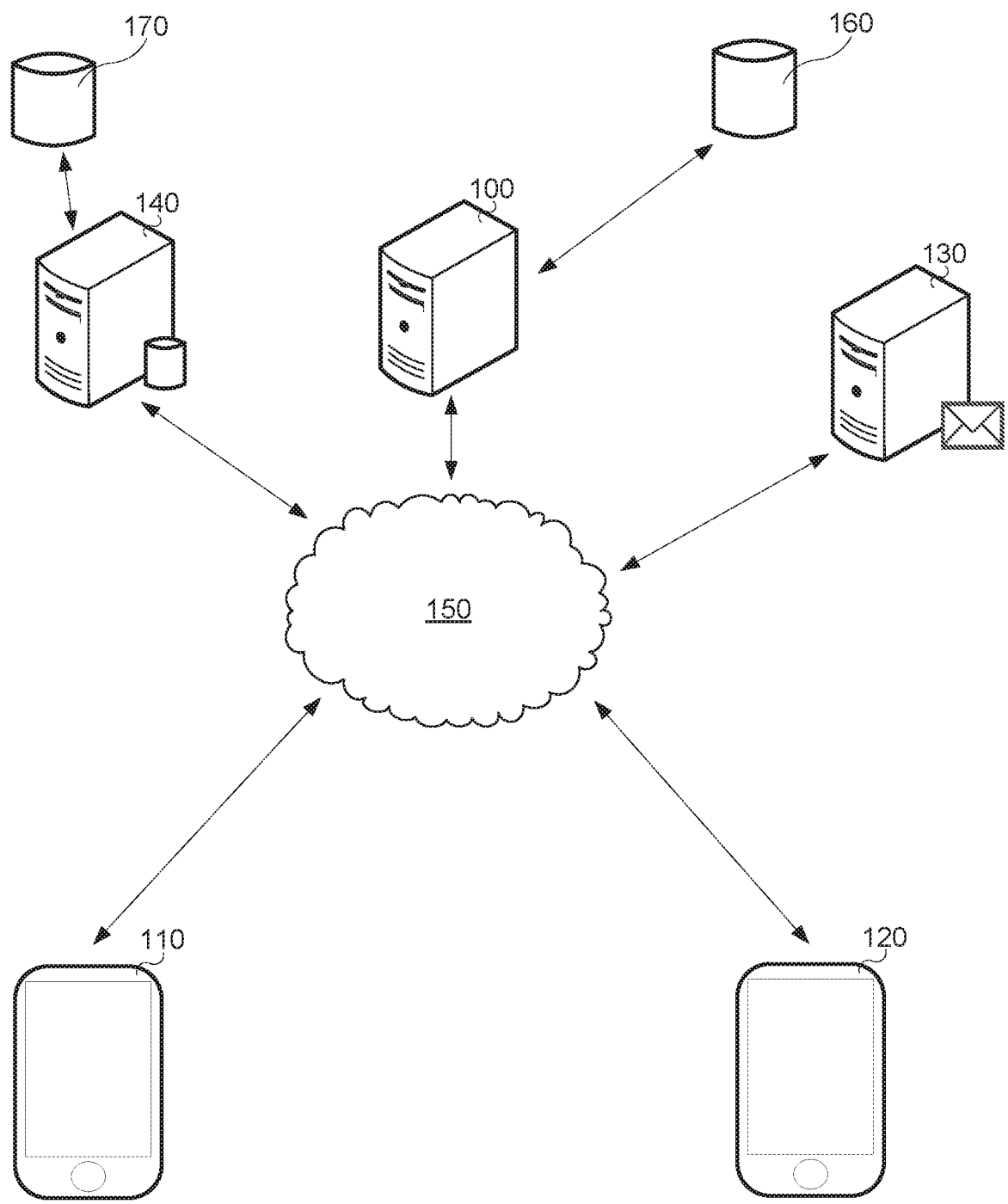
FIG. 1 is a schematic operation diagram illustrating an operating environment of an example embodiment.

In one aspect, there is a provided a computer system for transferring value between database records, the computer system comprising: a processor; a communications module coupled to the processor; a storage module coupled to the processor; and, a memory coupled to the processor and storing instructions that, when executed by the processor, cause the computer system to: receive, from a remote electronic device over a network via the communications module, one or more configuration options for configuring a particular transfer of value between records in one or more databases, the configuration options specifying a graphical element to be provided upon completion of the transfer of value and an email address; send a request via the communications module to a communications server over the network, the request including the email address for use as a destination for a communication indicating that the transfer of value has been initiated, wherein the communication includes an indication of an identifier for the particular transfer of value; store, using the storage module, an indication of the graphical element in association with the identifier for the particular transfer of value; receive, via the communications module from a second remote electronic device over the network, a request to complete the transfer of value, the request to complete the transfer of value indicating the identifier for the particular transfer of value; retrieve, using the storage module, the indication of the graphical element based on the identifier indicated in the request; confirm the transfer of value by communicating with the communications server over the network via the communications module; and send, via the communications module to the second remote electronic device over the network, a reply indicating completion of the transfer, the reply including an indication of the retrieved indication of the graphical element, wherein the graphical element is displayable on the second remote electronic device to indicate completion of the transfer of value.

In another aspect, there is provided a computer-implemented method of transferring value between database records, the method comprising: receiving, from a remote electronic device over a network, one or more configuration options for configuring a particular transfer of value between records in one or more databases, the configuration options specifying a graphical element to be provided upon completion of the transfer of value and an email address; sending a request to a communications server over the network, the request including the email address for use as a destination for a communication indicating that the transfer of value has been initiated, wherein the communication includes an indication of an identifier for the particular transfer of value; storing an indication of the graphical element in association with the identifier for the particular transfer of value; receiving, from a second remote electronic device over the network, a request to complete the transfer of value, the request to complete the transfer of value indicating the identifier for the particular transfer of value; retrieving the indication of the graphical element based on the identifier indicated in the request; confirming the transfer of value by communicating with the communications server over the network; and sending, to the second remote electronic device over the network, a reply indicating completion of the transfer, the reply including an indication of the retrieved indication of the graphical element, wherein the graphical element is displayable on the second remote electronic device to indicate completion of the transfer of value.

In another aspect, there is provided a non-transitory computer-readable storage medium storing instructions that when executed by a processor of a computer system cause the computer system to: receive, from a remote electronic device over a network, one or more configuration options for configuring a particular transfer of value between records in one or more databases, the configuration options specifying a graphical element to be provided upon completion of the transfer of value and an email address; send a request to a communications server over the network, the request including the email address for use as a destination for a communication indicating that the transfer of value has been initiated, wherein the communication includes an indication of an identifier for the particular transfer of value; store an indication of the graphical element in association with the identifier for the particular transfer of value; receive, from a second remote electronic device over the network, a request to complete the transfer of value, the request to complete the transfer of value indicating the identifier for the particular transfer of value; retrieve the indication of the graphical element based on the identifier indicated in the request; confirm the transfer of value by communicating with the communications server over the network; and send, to the second remote electronic device over the network, a reply indicating completion of the transfer, the reply including an indication of the retrieved indication of the graphical element, wherein the graphical element is displayable on the second remote electronic device to indicate completion of the transfer of value.

It may be desirable to provide additional context regarding transfers of value. For example, context may be provided identifying or distinguishing a particular completed transfer of value. In a particular example, a picture or other graphical element may be associated with a particular transfer of value so that it can be displayed upon completion thereof. Displaying a picture of other graphic element may allow the particular transfer of value to be identified or distinguished. For example, a picture or graphical element may indicate or suggest a reason or occasion for a particular transfer. Additionally or alternatively, a picture or graphical element may indicate or suggest a source of a particular transfer.

As further described below, in some embodiments transfers of value may be initiated, completed, or otherwise performed in association with an existing value transfer server. For example, where a transfer of value corresponds to a transfer of funds between accounts, an existing system for performing one or more aspects of email money transfers may be employed. Some or all such existing email money transfer systems may have no or limited ability to transfer a graphical element. In some cases, it may also be undesirable to modify such an existing email money transfer system. In some such cases, it may be desirable to allow a picture or other graphical element to be associated with a particular transfer of value so that it can be displayed upon completion thereof in manners that do not require modification to or limit modification of some or all of the components of such existing email money transfer systems.

Some or all of the above potentially desirable features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a value transfer server 100, a first electronic device 110, a second electronic device 120, a communications server 130, and a database server 140 communicate via a network 150.

Each of the value transfer server 100, the first electronic device 110, the second electronic device 120, the communications server 130, and the database server 140 may be in geographically disparate locations. Put differently, one or more of the value transfer server 100, the first electronic device 110, the second electronic device 120, the communications server 130, and the database server 140 may be remote to others of the value transfer server 100, the first electronic device 110, the second electronic device 120, the communications server 130, and the database server 140.

The value transfer server 100, the communications server 130, and the database server 140 are computer systems. Computer systems may be, for example, a mainframe computer, a minicomputer, or the like. Computer systems may include one or more computing devices. For example, a computer system may include multiple computing devices such as, for example, database servers, compute servers, and the like. The multiple computing devices may be in communication using a computer network. For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The first electronic device 110 and the second electronic device 120 are also computing devices. In some embodiments, one or both of the first electronic device 110 and the second electronic device 120 may be a portable electronic device. For example, the first electronic device 110 and the second electronic device 120 may, as illustrated, be smartphones. However, one or both of the first electronic device 110 and the second electronic device 120 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, one or both of the first electronic device 110 and the second electronic device 120 may be associated with one or more users. For instance, a user may operate one of the first electronic device 110 and the second electronic device 120, and may do so to cause the electronic device to perform one or more operations consistent with the disclosed embodiments. In some embodiments, one or both the first electronic device 110 and the second electronic device 120 may include a smart card, chip card, integrated circuit card (ICC), and/or other card having an embedded integrated circuit.

As further described below, the value transfer server 100 is accessed by computing devices to initiate and complete transfers of value between database records. As further described below, the value transfer server 100 is accessed by electronic devices such as, for example, the first electronic device 110 and the second electronic device 120, to initiate and complete transfers of value. For example, the first electronic device 110 may communicate with the value transfer server 100 to initiate a transfer of value and the second electronic device 120 may communicate with the value transfer server 100 to complete the transfer of value (or vice-versa). As further described below, a graphical element may be associated with a particular transfer of value and may be displayed upon completion of that transfer of value. For example, a graphical element may be selected using the first electronic device 110 when used to initiate a transfer of value and that graphical element may be displayed via the second electronic device 120 when used to complete a transfer of value.

The value transfer server 100 may communicate with the communications server 130 regarding initiation and/or completion of transfers of value. The communications server 130 may send emails providing information regarding one or more initiated transfers of value. The emails may include metadata and/or hyperlinks allowing completion of one or more of the transfers of value to which they relate to be performed and/or triggered. In some embodiments, the communications server 130 may confirm completion of transfers of value.

Transfers of value may be between records in the same database or between records in different databases.

In some embodiments, one or more databases may be in communication with the value transfer server 100. For example, as illustrated, the value transfer server 100 may be in communication with a first database 160. In some embodiments, the first database 160 may be stored on the value transfer server 100. Additionally or alternatively, the first database 160 may be stored on another computer system (not shown) with which the value transfer server communicates. Additionally or alternatively, the first database 160 may be accessed via a network such as, for example, a local area network (LAN) or a storage area network (SAN). In some embodiments, the value transfer server 100 may also be in communication with additional databases (not shown). In the same or other embodiments, one or more databases may be accessed by the value transfer server 100 such as by way of another computer systems. For example, as illustrated, a second database 170 may be in communication with the database server 140. Value transfer server may access the second database 170 by way of the database server 140. For example, the value transfer server 100 may forward queries for execution against the second database 170 by the database server 140 and the database server 140 may send results of such queries to the value transfer server 100.

Figure 2:
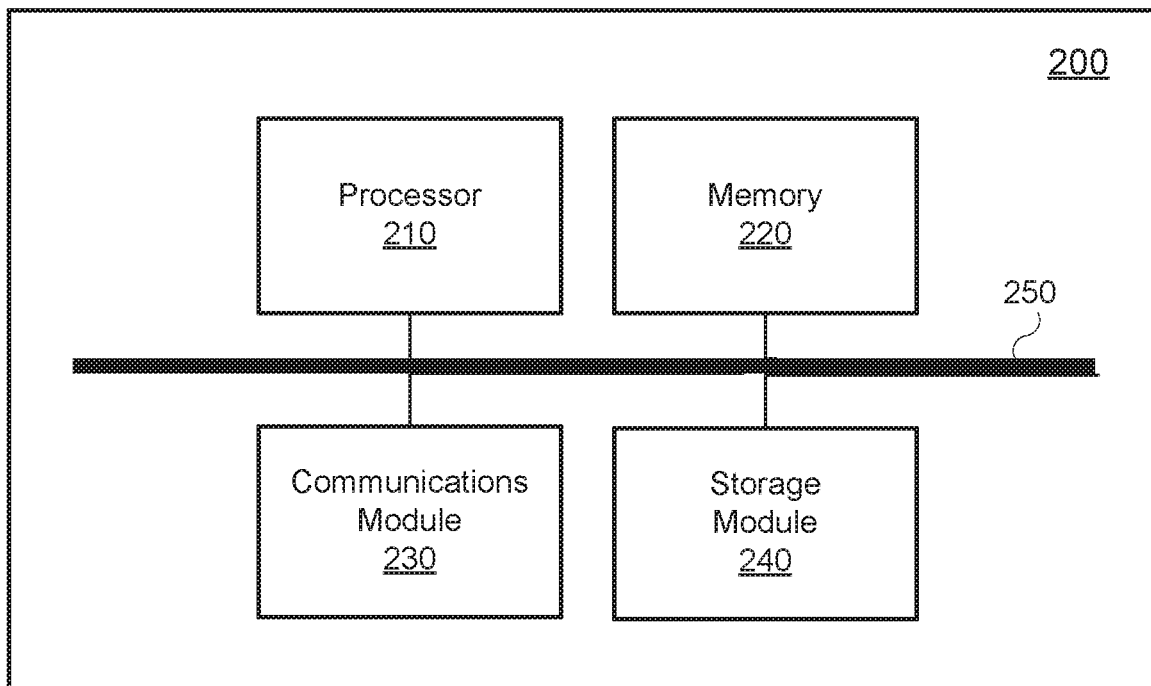
FIG. 2 is a high-level operation diagram of an example computing device.

FIG. 2 is a high-level operation diagram of an example computing device 200. In some embodiments, example computing device 200 may be exemplary of one or more of the value transfer server 100, the first electronic device 110, the second electronic device 120, the communications server 130, and the database server 140. As will be discussed in greater detail below, each of the value transfer server 100, the first electronic device 110, the second electronic device 120, the communications server 130, and the database server 140 includes software that adapts it to perform a particular function. More particularly, software of each of the value transfer server 100, the first electronic device 110, the second electronic device 120, the communications server 130, and the database server 140 cooperates, with communication between the value transfer server 100, the first electronic device 110, the second electronic device 120, the communications server 130, and the database server 140 via some manner of computer network, in order to initiate and/or complete transfers of value between records in one or more databases.

The example computing device 200 includes a variety of modules. For example, as illustrated, the example computing device 200 may include a processor 210, a memory 220, a communications module 230, and a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage.

Additionally or alternatively, the storage module 240 may access data stored remotely such as, for example, as may be accessed using a local area network (LAN) and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
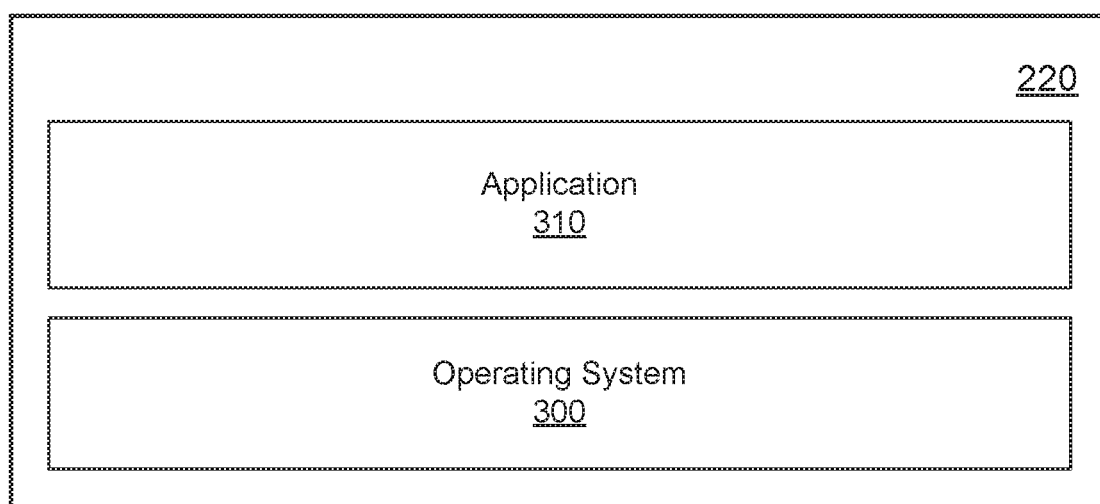
FIG. 3 depicts an example simplified software organization of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

The application 310 adapts the example computing device 200, in combination with the operating system 300, to operate as a device to a particular function. For example, the application 310 may cooperate with the operating system 300 to adapt a suitable embodiment of the example computing device 200 to operate as the first electronic device 110, the second electronic device 120, the value transfer server 100, the communications server 130, or the database server 140.

The operations of each of the value transfer server 100, the first electronic device 110, the second electronic device 120, the communications server 130, and the database server 140 will be described below with reference to FIGS. 4-10.

In some embodiments, the first electronic device 110 may be used to initiate a transfer of value. The operation of the first electronic device 110 in initiating a transfer of value is described with reference to a flowchart 400 of FIG. 4. Operations 410 and onward are performed by one or more processors of a computing device, such as for example the processor 210 of a suitably configured instance of the example computing device 200, executing software such as, for example, a suitable instance of the application 310.

At the operation 410, the first electronic device 110 receives input for configuring a transfer of value. For example, the first electronic device 110 may include an input module allowing input to be provided. In particular example, the first electronic device 110 may include an input device such as for example, a keyboard or a touchscreen, allowing input to be provided to the processor such as, for example, by way of the input module.

The input for configuring the transfer of value may include one or more configuration options and/or input allowing one or more configuration options to be derived. The configuration options may indicate a source database for the transfer of value. For example, the configuration options may indicate the first database 160 or the second database 170 as the source database for the transfer of value. Additionally or alternatively, the configuration options may indicate a particular record as the source for the transfer of value. For example, the configuration options may specify a particular record in the first database 160 or the second database 170 as the source for the transfer of value. In some embodiments, a particular record may be identified based on a value associated with that record such as, for example, a key. Additionally or alternatively, the configuration options may specify a graphical element to be provided upon completion of the transfer of value. Additionally or alternatively, the configuration options may specify an email address.

In some embodiments, an indication of the source database and/or the source database record may not be received and/or may not be included in the configuration options. For example, as further described below, one or both of the source database and/or the source database may instead be determined by a server such, as, for example, the value transfer server 100.

Specification of a graphical element may occur in a variety of manners. In some embodiments, a user may be provided with a list or some other manner of display allowing a user to select from amongst a plurality of predefined graphical elements. For example, it may be that the graphical element is a picture selected from a gallery of predefined pictures. Additionally or alternatively, a user may be allowed to create a custom graphical element. In one example of custom graphical elements, a user may be provided with the ability to draw an image. In another example of custom graphical elements, a user may create a custom graphical element by selecting and/or composing pre-defined graphical elements. For example, it may be that a user can drag-and-drop graphical elements in order to define a custom graphical element. In another example of custom graphical elements, a user may customize a predefined graphical element such as, for example, by changing colours and/or adding custom captions. In some embodiments, the graphical element may be represented in a well-known graphics format such as, for example, according to the Portable Network Graphics (PNG) format or the Graphical Interchange Format (GIF). In some embodiments the graphical element may be an animation. In some such embodiments, the animation may be represented using a well-known format for an animation or video such as, for example, animated GIF or according to one of the video format standards of the Motion Picture Experts Group (MPEG).

In some embodiments, a transfer of value between database records may correspond to a funds transfer between financial accounts. In other words, one or both of the source and destination database records may correspond to a financial account. For example, it may be that the value being transferred corresponds to an account balance. It may also be that the database records correspond to accounts between which amounts are being transferred. In some such embodiments, it may be that the databases correspond to particular financial institutions or subdivisions thereof. For example, it may be that the databases store information relating to accounts in particular geographical regions, such as, for example, particular states/provinces or groupings thereof, and/or for particular customer segments such as, for commercial and retail customer accounts.

Following receipt of input at the operation 410, control flow proceeds to an operation 420.

At the operation 420, the one or more configuration options are transmitted by the first electronic device 110. For example, the one or more configuration options may be sent via a computer network such as, for example, network 150. For example, where the first electronic device 110 is a suitably configured instance of the example computing device 200 it may be that the computer network is accessed using the communications module 230. The one or more configurations options may be sent to the value transfer server 100. For example, the configurations may be sent as a part of a request to initiate a transfer of value sent to the value transfer server 100 at the operation 420.

As noted above, in some embodiments, a transfer of value may correspond to a funds transfer between accounts. In some such embodiments, it may be that the configuration options are sent to a server of a financial institution. For example, it may be that the value transfer server 100 corresponds to a server of a financial institution. In a particular example, the value transfer server 100 may be or may correspond to a backend server. For example, it may be that the first electronic device 110 is a smartphone operating a mobile banking application and the value transfer server 100 is a backend server supporting the mobile banking application.

As further described below, the value transfer server 100 may be responsible for initiating the transfer of value. For example, it may be that the value transfer server 100 communicates with one or more other servers in order to initiate the transfer of value and/or to send a notification that the transfer of value has been initiated. For example, the value transfer server 100 may communicate with one or more other servers so that an email notification of the transfer of value is sent to an email address included in the configuration options. In a particular example, where the transfer of value corresponds to an electronic funds transfer, the value transfer server 100 may initiate the funds transfer and/or may trigger an email notification that the transfer has been initiated. The email notification may be sent to the email address included in the configuration options. In other words, the value transfer server 100 may initiate an "email money transfer".

Following the sending of the configuration options at the operation 420, control flow proceeds to an operation 430.

At the operation 430, the first electronic device 110 receives an acknowledgement of the transfer initiation. For example, the acknowledgement may be received via a computer network such as, for example, network 150. For example, the acknowledgement may be received by the same computer network via which the configuration options were sent at the operation 420. Where the first electronic device 110 is a suitably configured instance of the example computing device 200 it may be that the computer network is accessed using the communications module 230. The acknowledgement may be received from a server such as, for example, the value transfer server 100.

In some embodiments, the acknowledgment may be an identifier corresponding to the initiated transfer of value. For example, the acknowledgement may include some manner of tracking or confirmation identifier such as, for example, a confirmation number. Additionally or alternatively, the acknowledgement may include another identifier such as, for example, a transaction identifier. In a particular example, where the transfer of value corresponds to a funds transfer, the acknowledgement may include or indicate an identifier corresponding to the funds transfer.

As noted above, in some embodiments, the value transfer server 100 may perform one or more operations related to initiation of a transfer of value. The operation of the value transfer server 100 in initiating a transfer of value is described with reference to a flowchart 500 of FIG. 5. Operations 510 and onward are performed by one or more processors of a computing device, such as for example the processor 210 of a suitably configured instance of the example computing device 200, executing software such as, for example, a suitable instance of the application 310.

Figure 4:
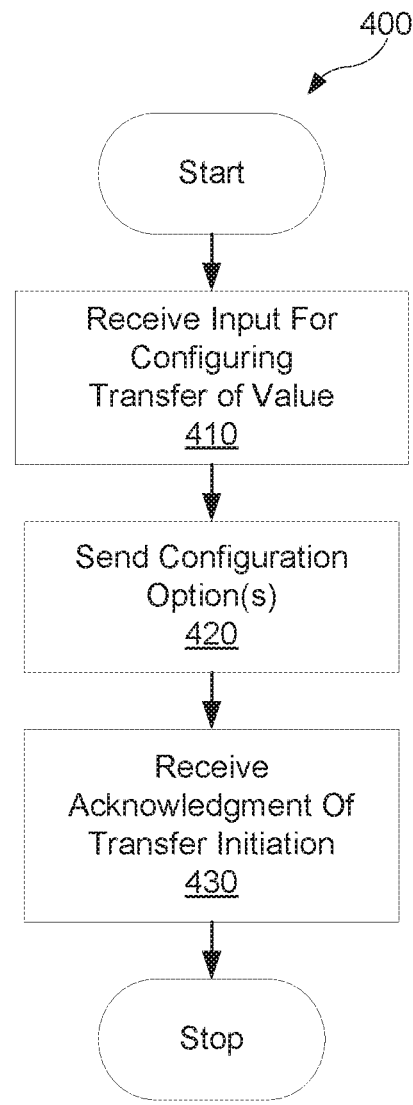
FIG. 4 is a flowchart depicting example operations performed by an electronic device in initiating a transfer of value.

At the operation 510, configuration options are received by the value transfer server 100. The one or more configuration options may be received via a computer network such as, for example, network 150. For example, where the value transfer server 100 is a suitably configured instance of the example computing device 200 it may be that the computer network is accessed using the communications module 230. The one or more configurations options may be received from the first electronic device 110. For example, it may be that the configuration operations correspond to configuration options transmitted by the first electronic device 110 at the operation 410 (FIG. 4). Accordingly, as described above, the configuration operations may include one or more of an indication of a source database for the data transfer, a particular record as the source for the data transfer, a graphical element to be provided upon the completion of the transfer of value, and an email address.

In some embodiments, the received configuration options may not include indications of one or both of the source database and the source database record. In some such embodiments, the source database and/or the source database record may be determined by the value transfer server 100. For example, the value transfer server 100 may determine the source database and/or the source database record. For example, the processor of the value transfer server 100 may execute instructions that cause the value transfer server 100 to identify a database record to act as a source for the transfer of value. Such a determination may be based on context such as, for example, state as may exist or may have been previously established. In a particular example, it may be that the value transfer server 100 receives the configuration options from a known client which may have previously authenticated with the value transfer server. Accordingly, the value transfer server may determine the source database and/or the source database record based on default values previously established for that client. In a particular example, where the transfer of value corresponds to an electronic funds transfer it may be that the source database and/or the source database record corresponds to a financial account. For example, it may be that the value transfer server 100 is receiving the configuration options from a banking application and the source database and/or source database record is determined based on a profile of a customer that has logged into the banking application.

Following receipt of configuration options at the operation 510, control flow proceeds to an operation 520.

At the operation 520, the value transfer server 100 sends a request to initiate a transfer of value. For example, the one or more configuration options may be sent via a computer network such as, for example, network 150. For example, where the value transfer server 100 is a suitably configured instance of the example computing device 200 it may be that the computer network is accessed using the communications module 230. The request may be based on one or more of the configuration options. The request to initiate the transfer of value may be sent to the communications server 130.

As further described below, responsive to the request, the receiver thereof—e.g., the communications server 130—causes the transfer of value to be initiated. The receiver may also perform related functions such as, for example, sending one or more notifications that the transfer of value has been initiated. In a particular example, it may be that an email is sent to an email address specified in the configuration options (and included in the request to initiate the transfer of value). For example, where the receiver is the communication server 130, the communication server 130 may send such an email. Additionally or alternatively, as further described below, it may be that notifications are sent by the value transfer server 100.

As noted above, in some embodiments the transfer of value may correspond to an electronic funds transfer. In some embodiments, the communications server 130 may be in communication with one or more systems responsible for initiating a funds transfer. In a particular example, the communications server 130 may be in communication with a central clearinghouse server responsible for acting as an intermediary for electronic funds transfers. For example, it may be that the communications server 130 is or is in communication with a central server providing email money transfer functionality as between accounts at the same or different financial institutions. In a particular example, the communications server 130 may be in communication with a central clearing facility as described in WO 02/059847 A1 to Certapay Inc. filed Jan. 25, 2002, the contents of which are herein incorporated by reference in their entirety. In some such embodiments, it may be that the value transfer server 100 serves as, or is in communication with, a web banking system of a financial institution.

In some embodiments, in addition to sending the request, the value transfer server 100 may perform operations related to initiation of the transfer of value. For example, where the transfer of value corresponds to a funds transfer, a hold may be placed against some or all of the funds being transferred. Additionally or alternatively, it may be that a temporary transfer of value is made from the source record to some intermediate record. This may, for example, correspond to placing funds into escrow in the case where the transfer of value corresponds to a funds transfer.

Following transmission of the request by the value transfer server 100 at the operation 520, control flow proceeds to an operation 530.

At the operation 530, the value transfer server 100 receives an indication of an identifier for the transfer. For example, the value transfer server 100 may receive an identifier such as, for example, a transaction identifier. The identifier may be received via a computer network, such as, for example the network referenced at the operation 520. For example, where the value transfer server 100 is a suitably configured instance of the example computing device 200 it may be that the computer network is accessed using the communications module 230. As further described below, the identifier may be received in a reply to the request sent at the operation 520. The identifier may be received from the communications server 130.

As noted above, responsive to receiving the identifier for the transfer, in some embodiments, the value transfer server 100 may send one or more notifications of the initiation of the transfer of value. For example, the value transfer server 100 may send an email notification of the initiation of the transfer of value such as to an email address that was provided in the configuration options. As noted above, in some embodiments the transfer of value may correspond to an electronic funds transfer. In some such embodiments, the value transfer server 100 may send a notification that an electronic money transfer has been initiated. For example, the value transfer server 100 may send an email notification that an "email money transfer" has been initiated.

Following receipt of the identifier for transfer at the operation 530, control flow proceeds to an operation 540.

As noted above, the transfer of value may be initiated via another actor such as, for example, the communications server 130. For example, as further described below, it may be that the communications server 130 is responsible for or acts as an intermediary for initiating, tracking, and completing transfers of value. It may be however, that such an actor is incapable of storing and/or transferring a graphical element. For example, the communications server 130 may be an existing data transfer server. In a particular example, the communications server 130 may be part of an existing fund transfer system. Because such systems may be accessed by more than one entity and/or may be managed by a third-party, it may difficult or burdensome to modify such systems to store and/or transfer a graphical element.

As such, at the operation 540, the graphical element may be stored by the value transfer server 100 in association with the identifier for the transfer of value (e.g., as was received at the operation 530). For example, where the value transfer server 100 is a suitably configured embodiment of example computing device 200, an indication of the graphical element may be stored in association with the identifier for the particular transfer of value using the storage module 240. In some embodiments, the stored indication of the graphical element may be a token such as may result from tokenization thereof.

As further described below, storing the graphical element in association with the identifier for the particular transfer of value may allow the graphical element to be later retrieved so that it can be provided upon completion of the transfer of value. Conveniently, in this way a graphical element may be provided upon completion of a transfer of value without modification to an existing communications server 130. For example, in the case of transfers of value corresponding to electronic funds transfer, a graphical element may be provided upon completion of a transfer of value without modification to existing electronic funds transfer server(s) such as, for example, to an existing central clearing facility.

At the operation 550, an acknowledgement that the transfer of value has been initiated is sent the value transfer server 100. For example, an acknowledgment may be sent via a computer network such as, for example, network 150. Where the value transfer server 100 is a suitably configured instance of the example computing device 200 it may be that the computer network is accessed using the communications module 230. The acknowledgement may be sent to the first electronic device 110. For example, it may be that the acknowledgement acts as a reply to the receipt of the configuration options at the operation 510.

The operations in the flowchart 500 are by way of example may be susceptible to suitable variation. For example, in some embodiments, an identifier for the transfer of value is assigned by the value transfer server 100. An identifier assigned by the value transfer server 100 may be included in a request to initiate the transfer such as is transmitted at the operation 520. In some embodiments where the value transfer server 100 assigns an identifier for the transfer, the operation 530 may be varied or omitted. For example, it may be that at the operation 530, an acknowledgement that a transfer has been initiated may be received in place of an indication of an identifier for the transfer. Such an acknowledgement may or may not include an indication of an identifier for the transfer. Additionally or alternatively, it may be that the value transfer server 100 receives an indication of an identifier for the transfer at the operation 530 and then maintains a mapping between the identifier it assigns and other identifiers for the transfer such as, for example, the indicated identifier.

Figure 6:
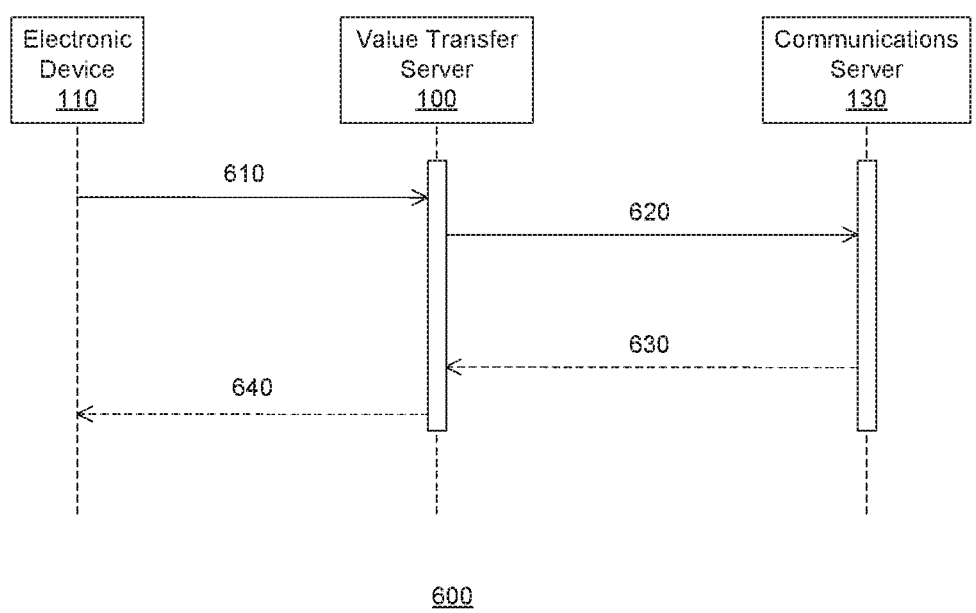
FIG. 6 is a sequence diagram depicting communications between computer systems during initiation of a transfer of value, exemplary of an embodiment.

FIG. 6 illustrates a sequence diagram 600, similar to a Unified Modelling Language (UML) sequence diagram, that shows how the value transfer server 100, the first electronic device 110 and the communications server 130 may communicate in some embodiments, and, in particular, depicting messages exchanged therebetween in initiating a transfer of value.

In the following description of the sequence diagram 600, discussion is made of various messages being sent and received via a computer network such as, for example, network 150. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that the various message pairs illustrated in FIG. 6—e.g. messages 610 and 640—correspond, respectively, to an RPC or a web service API call and a reply or callback in response to that call.

Figure 5:
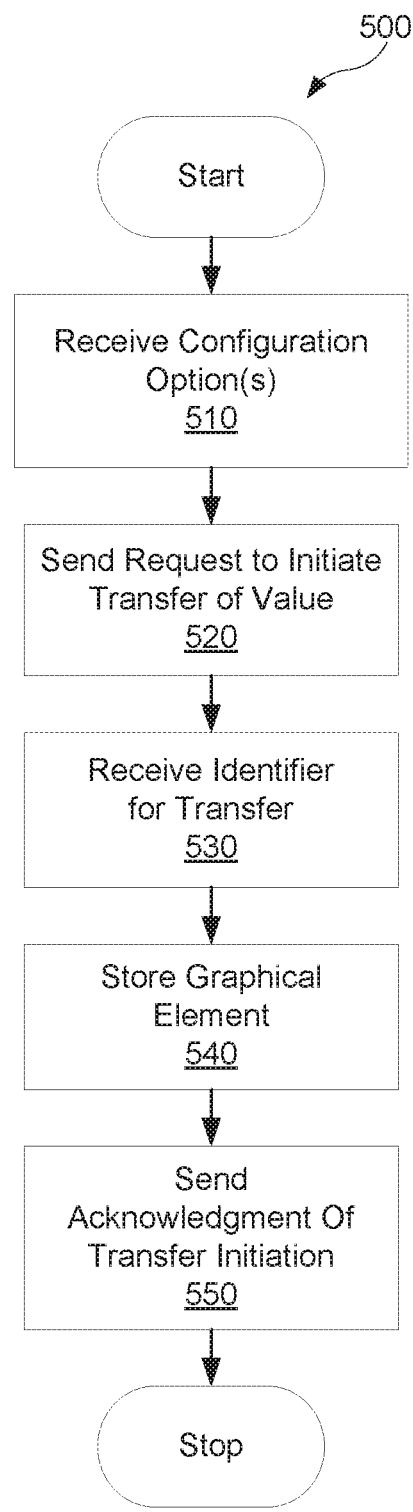
FIG. 5 is a flowchart depicting example operations performed by a value transfer server in initiating a transfer of value.

As illustrated, at the beginning of the sequence the first electronic device 110 may send a message 610 to the value transfer server 100. The message 610 may include one or more configuration options. For example, the message 610 may correspond to the configuration options such as are sent by the first electronic device 110 at the operation 420 (FIG. 5) and/or to the configuration options such as are received by the value transfer server 100 at the operation 510 (FIG. 5).

Next, responsive to the message 610, the value transfer server 100 may, as illustrated, send a message 620 to the communications server 130. The message 620 may be a request to initiate a transfer of value. For example, the message 620 may correspond to the request to initiate a transfer of value sent by the value transfer server 100 at the operation 520 (FIG. 5).

Next, responsive to the message 620, the communications server 130 may, as illustrated, send a message 630 to the value transfer server 100 further to the initiation of a transfer of value. In some embodiments, the message 630 may be considered a reply to the message 620. The message 630 may confirm that transfer of value has been initiated. In some embodiments the message 630 may include an identifier for the transfer of value. More particularly, the message 630 may, for example, correspond to the indication of an identifier for the particular transfer of value. As such, it may be that the message 630 corresponds to indication of an identifier for the transfer received by the value transfer server 100 at the operation 530 (FIG. 5).

Next, responsive to the message 630, the value transfer server 100 may, as illustrated, send a message 640 to the first electronic device 110 acknowledging initiation of the transfer of value. The message 640 may correspond to an acknowledgement sent by the value transfer server 100 at the operation 550 (FIG. 5) and/or to the acknowledgment received by the first electronic device 110 at the operation 430 (FIG. 4).

Notably, each of the various messages 610-640 may be transmitted and handled by each of the value transfer server 100, the first electronic device 110 and the communications server 130 in real time or near real time, including sending any other messages responsive thereto as further described below. Conveniently, in this way a transfer of value that will provide a graphical element upon completion thereof may be initiated in real time or near real time.

After a transfer of value is initiated it may be subsequently completed. Alternatively, some initiated transfers of value may never complete such as, for example, where completion is never initiated. In some embodiments, transfers of value that are not completed within a predefined timeframe may be automatically cancelled. For example, transfers of value that correspond to a funds transfer may be automatically cancelled if not completed within a predefined timeframe. When a funds transfer is cancelled, any hold on funds allocated to the transfer may be released. Additionally or alternatively, any monies placed into escrow may be refunded.

Returning to the scenario of completing a previously initiated transfer of value, in some embodiments another electronic device—e.g., potentially different from the first electronic device 110—may be used to complete a transfer for value. For example, the second electronic device 120 may be used to complete a transfer of value. The operation of the second electronic device 120 in initiating a transfer of value is described with reference to a flowchart 700 of FIG. 7. Operations 710 and onward are performed by one or more processors of a computing device, such as for example the processor 210 of a suitably configured instance of the example computing device 200, executing software such as, for example, a suitable instance of the application 310.

At the operation 710, the second electronic device 120 sends a request to complete a transfer of value. The request may be sent via a computer network such as, for example, network 150. For example, where the second electronic device 120 is a suitably configured instance of the example computing device 200 it may be that the computer network is accessed using the communications module 230. The request may be sent to the value transfer server 100.

The request may include an indication of a particular previously initiated transfer of value. For example, the request may include an indication of an identifier for a particular transfer of value. The identifier may, for example, correspond to the identifiers discussed above in relation to the operation 530 (FIG. 5) and/or the operation 430 (FIG. 4).

In some embodiments, the request may be based on information included in a notification received at the second electronic device 120. For example, the request may be based on information provided in an email notification of a transfer of value. In a particular example, where the transfer of value corresponds to an electronic funds transfer, the request may be based on information provided in an email money transfer notification.

The request may be triggered by input received by the second electronic device 120. For example, a user may click on a link in an email. In another example, a user may select from amongst value transfers for which a notification or indication of initiation was previously received. A user may make such a selection using a suitable application executing at the second electronic device 120. In a particular example, where the transfer of value corresponds to an electronic funds transfer, the user may click on a link in an email money transfer notification or, alternatively, may select the transfer in a suitable financial application such as, for example, a banking application or a money transfer application.

Following sending of the request to complete the transfer of value at the operation 710, control flow proceeds to an operation 720.

At the operation 720, a reply may be received indicating completion of the transfer of value. The request may be received via a computer network such as, for example, network 150. For example, where the second electronic device 120 is a suitably configured instance of the example computing device 200 it may be that the computer network is accessed using the communications module 230. The reply may be received from the value transfer server 100. The reply may include an indication of a graphical element. As discussed below, the correspond graphical element may be displayable on the second electronic device 120 to indicate completion of the transfer of value.

Following receipt of the reply at the operation 720, control flow proceeds to an operation 730.

At the operation 730, the graphical element is displayed by the second electronic device 120 to indicate completion of the transfer of value. For example, where the second electronic device is equipped with an integrated display, the graphical element may be displayed as an element in a screen display. In another example, the graphical element may be displayed using an animation module such as may form, for example, a part of the application 310 in embodiments where the second electronic device 120 is a suitably configured instance of the example computing device 200. For example, an animation module may be employed if the graphical element is an animation or video such as may be, for example, represented as an animated GIF as described above.

Figure 8:
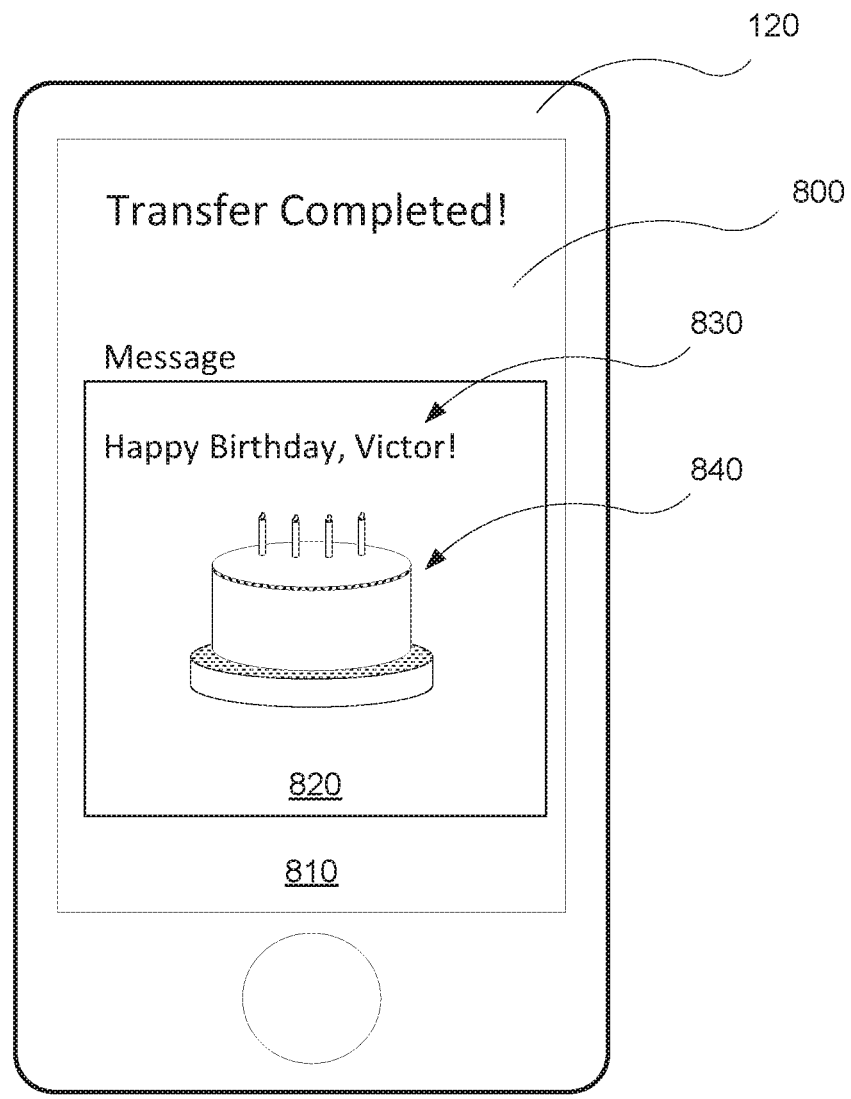
FIG. 8 illustrates an example screen display of an example electronic device indicating completion of a transfer of value.

In a particular example, where the second electronic device 120 is a smartphone, the graphical element may be displayed as element in a screen display. FIG. 8 illustrates an example screen display of such an embodiment of the second electronic device 120 indicating completion of a transfer of value.

Figure 7:
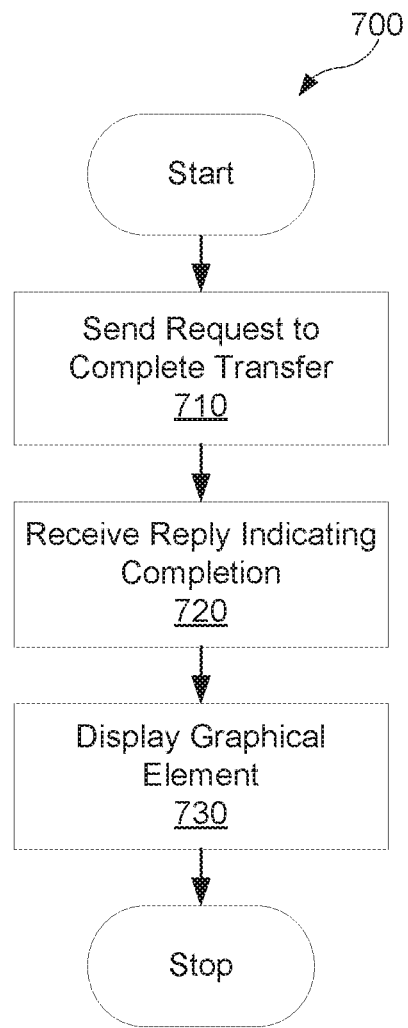
FIG. 7 is a flowchart depicting example operations performed by an electronic device in completing a transfer of value.

As illustrated, the second electronic device 120 includes a display 800. Display 800 displays a screen display 810 indicating a transfer of value has been completed. As illustrated, an area 820 of the screen display 810 includes an indication of the graphical element. In particular, the area 820 includes a caption 830 ("Happy Birthday, Victor!") and a picture 840. In some embodiments, the picture 840 may correspond to the graphical element, an indication of which was received at the operation 720 (FIG. 7). Alternatively, both the picture 840 and the caption 830 may correspond to the graphical element.

In some embodiments, the displayed graphical element may be interactive. For example, in the particular example of the screen display 810, the picture 840 may, further to input received by the second electronic device 120, animate to show the candles being blown out. In a particular example, it may be that the display 800 is a touchscreen and the user may trigger such an animation by tapping or rubbing the display 800 such as, for example, in the region of the candles in the picture 840. Additionally or alternatively, the second electronic device 120 may include a camera and the picture 840 may animate responsive to detecting, via the camera, a particular motion or action such as, for example, a person pursing their lips as if to blow out a candle.

As discussed above, the graphical element may include an indication of the occasion for the transfer of value. As illustrated, for example, a transfer of value may be made on the occasion of a birthday. For example, it may be that the transfer of value corresponds to an electronic funds transfer corresponding to a birthday gift (e.g. birthday money).

As noted above, in some embodiments, the value transfer server may perform one or more operations related to completion of a transfer of value. The operation of the value transfer server 100 in completing a transfer of value is described with reference to a flowchart 900 of FIG. 9. Operations 910 and onward are performed by one or more processors of a computing device, such as for example the processor 210 of a suitably configured instance of the example computing device 200, executing software such as, for example, a suitable instance of the application 310.

At the operation 910, a request to complete a particular transfer of value is received by the value transfer server 100. For example, the request may be received via a computer network such as, for example, network 150. For example, where the value transfer server 100 is a suitably configured instance of the example computing device 200 it may be that the computer network is accessed using the communications module 230. The request may be received from the second electronic device 120. For example, it may be that the request corresponds to a request transmitted by the second electronic device at the operation 710 (FIG. 7). As such, the request may include an identifier for a particular transfer of value.

The request may include additional information over and above the identifier for the particular transfer of value.

For example, the request may indicate a destination database for the transfer of value. For example, the request may indicate the first database 160 or the second database 170 as the destination database for the transfer of value. Additionally, the request may indicate a particular record as the destination for the transfer of value. For example, the request may specify a particular record in the first database 160 or the second database 170 as the destination for the transfer of value. In some embodiments, a particular record may be identified based on a value associated with that record such as, for example, a key.

In other embodiments, the request may not include indications of one or both of the destination database and the destination database record. In some such embodiments, the destination database and/or the destination database record may be determined by the value transfer server 100. For example, the destination database and/or the destination database record may be determined by the value transfer server 100 based on the request. More specifically, the processor of the value transfer server 100 may execute instructions that cause the value transfer server 100 to identify a database record to act as a destination for the transfer of value. Such a determination may be based on the request and, additionally or alternatively, context such as, for example, state as may exist or may have been previously established. In a particular example, it may be that the value transfer server 100 receives the request from a known client which may have previously authenticated with the value transfer server. Accordingly, the value transfer server may determine the destination database and/or the destination database record based on default values previously established for that client. In a particular example, where the transfer of value corresponds to an electronic funds transfer it may be that the destination database and/or the destination database record corresponds to a financial account. For example, it may be that the value transfer server 100 is receiving the request from a banking application and the destination database and/or destination database record is determined based on a profile of a customer that has logged into the banking application.

Following receipt of the request at the operation 910, control flow proceeds to an operation 920.

At the operation 920, an indication of a graphical element associated with the particular transfer is retrieved. For example, where the value transfer server 100 is a suitably configured embodiment of example computing device 200, an indication of the graphical element may be retrieved, using the storage module 240, based on the identifier indicated in the request. Notably, the retrieved indication may correspond to an indication previously stored in association with the identifier for the particular transfer of value such as, for example, at the operation 540 (FIG. 5).

Following retrieval of the graphical element at the operation 920, control flow proceeds to an operation 930.

At the operation 930, the transfer of value may be completed. Additionally, the completion of the transfer of value may be confirmed.

In one example, value may be transferred from a source database to a destination database. More particularly, value may be transferred between a source database record and a destination databases record. The source and destination database may, as described above, be as previously indicated or determined. Similarly, the source and destination database record may, as described above, be as previously indicated or determined.

As noted, the transfer of value may correspond to an electronic funds transfer. In some such embodiments, at the operation 930, the funds may be transferred into the destination accounts. As described above, a hold may have been placed against some or all of the funds being transferred. Accordingly, the operation 930 may also have the side effect of releasing some or all of such holds. Additionally or alternatively, as described above, some funds may be in escrow. For example, it may be that there was a temporary transfer of value from the source record to some intermediate record. Accordingly, it may be that value is transferred from the intermediate record to the destination record by way of the operation 930.

In some embodiments, completion of the transfer of value may entail sending one or more transmissions to one or more other devices.

For example, transmissions may be sent via a computer network such as, for example, network 150. For example, where the value transfer server 100 is a suitably configured instance of the example computing device 200 it may be that the computer network is accessed using the communications module 230. One or more of the transmissions may be sent to the communications server 130. Additionally or alternatively, one or more transmissions may be received from the communications server 130.

In some embodiments, it may be that the transmissions trigger the completion of the transfer of value. For example, it may be that the communications server 130 causes, performs, controls, or directs the transfer between databases. Accordingly, it may be that identification of one or both of the source and destination databases and/or one or both of the source or destination records is sent to the communications server 130.

Additionally or alternatively, the transmissions may trigger confirmation that the transfer of value has occurred. For example, it may be that the transmissions cause the communications server 130 to send one or more notifications that the transfer of value has been completed. For example, the communications server 130 may send an email to the sender to indicate that the transfer of value has been completed. For example, where the transfer of value corresponds to an electronic funds transfer, an email may be sent indicating completion of the funds transfer. Such an email may be received at another device such as, for example, the first electronic device 110. In a particular example, the first electronic device 110 may be sent an email or other notification indicating that a transfer of value such as, for example, an email money transfer, was successful.

Following completion and confirmation of the transfer of value at the operation 930, control flow proceeds to an operation 940.

At the operation 940, a confirmation of completion of the transfer of value may be sent. For example, a confirmation may be sent via a computer network such as, for example, network 150. Where the value transfer server 100 is a suitably configured instance of the example computing device 200 it may be that the computer network is accessed using the communications module 230. The confirmation may be sent to the second electronic device 120. For example, it may be that the confirmation acts as a reply to the receipt of the request at the operation 910. In a particular example, the confirmation may correspond to the reply indicating completion received by the second electronic device 120 at the operation 720 (FIG. 7).

The reply includes an indication of the retrieved indication of the graphical element, i.e. as was retrieved at the operation 920. The graphical element may be displayable to indicate completion of the transfer of value. More particularly, the graphical element may be displayable on the second electronic device 120 to indicate completion of the transfer of value. For example, the graphical element may be displayed at the second electronic device 120 such as at the operation 730 (FIG. 7).

Figure 10:
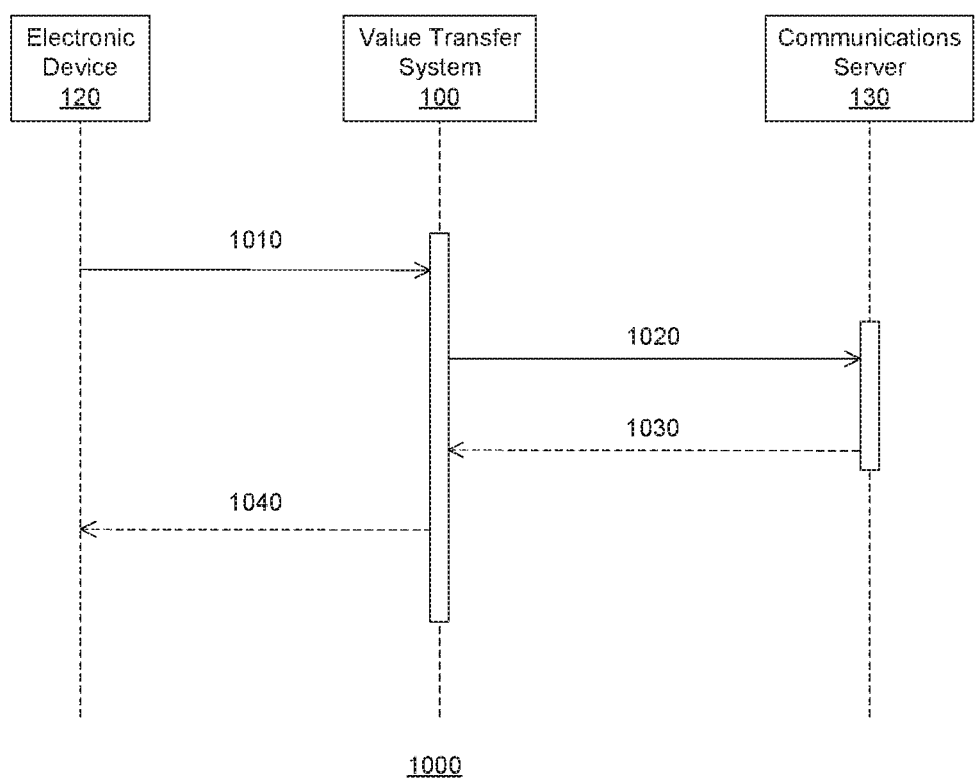

FIG. 10 illustrates a sequence diagram 1000, similar to a Unified Modelling Language (UML) sequence diagram, that shows how the value transfer server 100, the second electronic device 120 and the communications server 130 may communicate in some embodiments, and, in particular, depicting messages exchanged therebetween in completing a transfer of value.

In the following description of the sequence diagram 1000, discussion is made of various messages being sent and received via a computer network such as, for example, network 150. In some embodiments, the exchanged messages may be implemented as messages. However, in other embodiments, some or all of the illustrated messages may not correspond to messages per se when sent over the computer network but may instead be implemented using techniques such as for example remote procedure calls (RPC) and/or web services application program interfaces (APIs). For example, it may be that the various message pairs illustrated in FIG. 10—e.g. messages 1010 and 1040—correspond, respectively, to an RPC or a web service API call and a reply or callback in response to that call.

Figure 9:
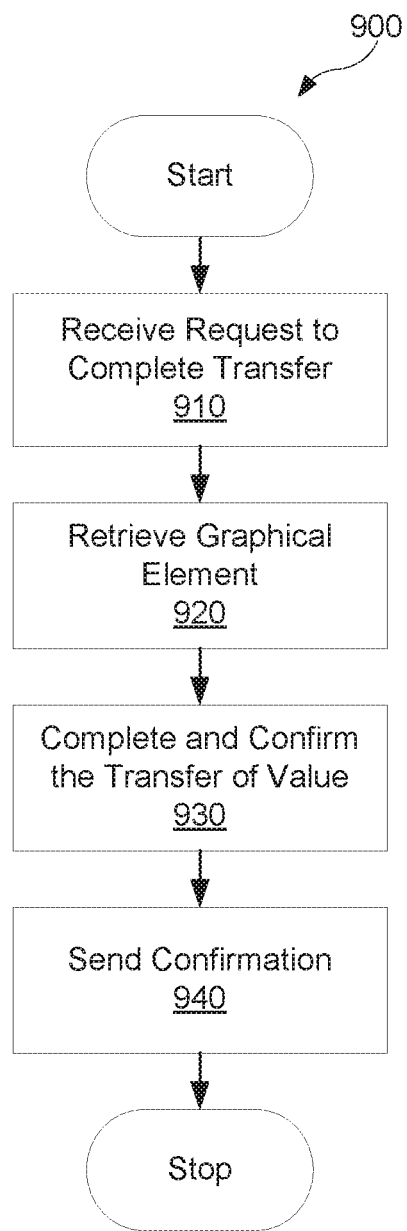
FIG. 9 is a flowchart depicting example operations performed by a value transfer server in completing a transfer of value; and, FIG. 10 is a sequence diagram depicting communications between computer systems during completion of a transfer of value, exemplary of an embodiment.

As illustrated, at the beginning of the sequence the second electronic device 120 may send a message 1010 to the value transfer server 100. The message 1010 may include a request to complete a transfer. For example, the message 1010 may correspond to the request such as is sent by the second electronic device 120 at the operation 710 (FIG. 7) and/or to the request such as is received by the value transfer server 100 at the operation 910 (FIG. 9).

Next, responsive to the message 1010, the value transfer server 100 may, as illustrated, send a message 1020 to the communications server 130. The message 1020 may be a transmission related to completion and/or confirmation of the completion of the transfer of value. For example, the message 1020 may correspond to a transmission such as may be sent by the value transfer server 100 at the operation 930 (FIG. 9).

Next, responsive to the message 1020, the communications server 130 may, as illustrated, send a message 1030 to the value transfer server 100 further to the completion and/or confirmation of the completion of the transfer of value. In some embodiments, the message 1030 may be considered a reply to the message 1020. The message 1030 may correspond to a transmission such as may be received by the value transfer server 100 at the operation 930 (FIG. 9).

Next, responsive to the message 1030, the value transfer server 100 may, as illustrated, send a message 1040 to the second electronic device 120 acknowledging completion of the transfer of value. The message 1040 may correspond to a confirmation sent by the value transfer server 100 at the operation 940 (FIG. 9) and/or to the reply indicating completion received by the second electronic device 120 at the operation 720 (FIG. 7). As such, the message 1030 may include an indication of a graphical element. The graphical element may be displayable on the second electronic device 120 to indicate completion of the transfer of value.

Notably, each of the various messages 1010-1040 may be transmitted and handled by each of the value transfer server 100, the second electronic device 120 and the communications server 130 in real time or near real time, including sending any other messages responsive thereto as further described below. Conveniently, in this way a transfer of value that will provide a graphical element upon completion thereof may be completed in real time or near real time.

The above described example embodiments are susceptible to one or more modifications. Example modifications are described below.

As described above, in some embodiments, an identifier for an initiated transfer of value is received from the communications server 130. In other embodiments, it may be that the identifier is assigned by the value transfer server 100. For example, the identifier may be assigned at the operation 520 (FIG. 5). Such an identifier could be included in the request to initiate the transfer of value sent at the operation 520. In some such embodiments, at the operation 530, a confirmation of initiation of the transfer of value may be received at the operation 530 (FIG. 5). Such a confirmation may or may not include the identifier.

In some embodiments, the graphical element may be included or provided in other stages. For example, in some embodiments, the graphical element or an indication thereof may be received at the operation 430 (FIG. 4) and/or may be send at the operation 550. Additionally or alternatively, the graphical element and/or an indication thereof may be included in a notification that a transfer of value has been initiated. For example, it may be that the graphical element could be displayed with a notification that a transfer of value has been initiated. Additionally or alternatively, notifications could be sent signalling that a transfer of value has been initiated that include the graphical element and/or an indication thereof. For example, one or both of the first electronic device 110 and the value transfer server 100 may transmit a notification that a transfer of value has been initiated that includes the graphical element and/or an indication thereof. In a particular example, one or both of the first electronic device 110 and the value transfer server 100 may send an email. For example, an email may be sent to the same email address included in the configuration options sent at the operation 420 (FIG. 4) and/or received at the operation 510 (FIG. 5). Additionally or alternatively, notifications may be sent to a different address. For example, it may be that a notification including the graphical element or an indication thereof is sent to an address such as, for example, an email address, associated with an initiator of the email transfer.

In some embodiments, the configuration options sent/received at operation 420 and operation 520, respectively, may not include the graphical element or an indication thereof. In some such embodiments, the graphical element may only be requested where it can be determined that the email address provided in the configuration options is associated with one or more database records defined in the same database as the source database record. That the email address is associated with one or more database records defined in the same database as the source database record may be determined based on the email address having been specified as a configuration option in one or more previous transfers of value (initiated and/or completed) involving one or more database records. For example, where the transfer of value corresponds to a funds, a transfer it may be that the email address has previously been used in association with a previously initiated and/or completed electronic funds transfer. In some such embodiments, a request may be send to the first electronic device 110 responsive to the determination that the email address is associated with one or more database records defined in the same database as the source database record. The request may be a request to specify a graphical element. More particularly, the request may be a request to specify a graphical element to be provided upon completion of the transfer of value. A graphical element may then be selected or provided such as in manners described above. The graphical element may then be transmitted to and received by the value transfer server 100. For example, the value transfer server 100 may receive a further configuration option specifying a graphical element that is, for example, to be provided upon completion of the transfer of value.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted. certain adaptations and modifications of the described embodiments can be made. Therefore, the above discussed embodiments are considered to be illustrative and not restrictive.

What is claimed is:

1. A computer system comprising:
a processor; and
a memory coupled to the processor and storing instructions that, when executed by the processor, cause the computer system to:
receive, from a first remote electronic device being employed to initiate an electronic funds transfer, one or more configuration options for configuring the electronic funds transfer, the configuration options specifying a graphical element selected using the first remote electronic device for display at a second remote electronic device used to complete the electronic funds transfer upon completion of the electronic funds transfer and an address;
initiate the electronic funds transfer, the initiation of the electronic funds transfer triggering a communication to the address indicating that the electronic funds transfer has been initiated; and
store an indication of the graphical element in association with an identifier for the electronic funds transfer,
wherein storing the indication of the graphical element in association with the identifier for the electronic funds transfer allows retrieval of the indication of the graphical element based on the identifier for signaling the second remote electronic device to display the graphical element on the second remote electronic device to indicate completion of the electronic funds transfer.

2. The computer system of claim 1, wherein the address is an email address.

3. The computer system of claim 1, wherein the instructions, when executed by the processor, further cause the computer system to identify a first financial account to act as a source for the electronic funds transfer.

4. The computer system of claim 3, wherein receiving the one or more configuration options comprises:
receiving a configuration option specifying the address; and
determining that the address is associated with a second financial account and that the first and second financial accounts are both associated with the same financial institution,
wherein the graphical element is selected further to the determination that the address is associated with the second financial account and that the first and second financial accounts are both associated with the same financial institution.

5. The computer system of claim 4, wherein determining that the address is associated with the second financial account includes determining that the address has been specified as a configuration option in one or more previous electronic funds transfers involving the second financial account.

6. The computer system of claim 3 wherein the instructions, when executed by the processor, cause the computer system to identify a second financial account acting as a destination for the electronic funds transfer.

7. The computer system of claim 6, wherein the second financial account is identified based on a request to complete the electronic funds transfer.

8. The computer system of claim 1, wherein the graphical element includes at least one of an image and an animation.

9. A computer-implemented method comprising:
receiving, from a first remote electronic device being employed to initiate an electronic funds transfer, one or more configuration options for configuring anthe electronic funds transfer, the configuration options specifying a graphical element selected using the first remote electronic device for display at a second remote electronic device used to complete the electronic funds transfer upon completion of the electronic funds transfer and an address;
initiating the electronic funds transfer, the initiation of the electronic funds transfer triggering a communication to the address indicating that the electronic funds transfer has been initiated; and
storing an indication of the graphical element in association with an identifier for the electronic funds transfer, wherein storing the indication of the graphical element in association with the identifier for the electronic funds transfer allows retrieval of the indication of the graphical element based on the identifier for signaling the second remote electronic device to display the graphical element on the second remote electronic device to indicate completion of the electronic funds transfer.

10. The computer-implemented method of claim 9, wherein the address is an email address.

11. The computer-implemented method of claim 9, further comprising:
identifying a first financial account to act as a source for the electronic funds transfer.

12. The computer-implemented method of claim 11, wherein receiving the one or more configuration options comprises:
receiving a configuration option specifying the address; and
determining that the address is associated with a second financial account and that the first and second financial accounts are both associated with the same financial institution,
wherein the graphical element is selected further to the determination that the address is associated with the second financial account and that the first and second financial accounts are both associated with the same financial institution.

13. The computer-implemented method of claim 12, wherein determining that the address is associated with the second financial account includes determining that the address has been specified as a configuration option in one or more previous electronic funds transfers involving the second financial account.

14. The computer-implemented method of claim 11, further comprising:
identifying a second financial account acting as a destination for the electronic funds transfer.

15. The computer-implemented method of claim 14, wherein the second financial account is identified based on a request to complete the electronic funds transfer.

16. The computer-implemented method of claim 9, wherein the graphical element includes at least one of an image and an animation.

17. A non-transitory computer-readable storage medium storing instructions that when executed by a processor of a computer system cause the computer system to:
receive, from a first remote electronic device being employed to initiate an electronic funds transfer, one or more configuration options for configuring the electronic funds transfer, the configuration options specifying a graphical element selected using the first remote electronic device for display at a second remote electronic device used to complete the electronic funds transfer upon completion of the electronic funds transfer and an address;
initiate the electronic funds transfer, the initiation of the electronic funds transfer triggering a communication to the address indicating that the electronic funds transfer has been initiated; and
store an indication of the graphical element in association with an identifier for the electronic funds transfer, wherein storing the indication of the graphical element in association with the identifier for the electronic funds transfer allows retrieval of the indication of the graphical element based on the identifier for signaling the second remote electronic device to display the graphical element on the second remote electronic device to indicate completion of the electronic funds transfer.

18. The computer-readable storage medium of claim 17, wherein the address is an email address.

19. The computer-readable storage medium of claim 17, wherein the instructions, when executed, further cause the computer system to identify a first financial account to act as a source for the electronic funds transfer, and wherein receiving the one or more configuration options comprises:
receiving a configuration option specifying the address; and determining that the address is associated with a second financial account and that the first and second financial accounts are both associated with the same financial institution, wherein the graphical element is selected further to the determination that the address is associated with the second financial account and that the first and second financial accounts are both associated with the same financial institution.

20. The computer-readable storage medium of claim 17, wherein the graphical element includes at least one of an image and an animation.

\* \* \* \* \*